(12) United States Patent
Johnston et al.

(10) Patent No.: US 6,475,594 B2
(45) Date of Patent: Nov. 5, 2002

(54) SORBENT MAT ASSEMBLY

(75) Inventors: Milo Johnston, Doylestown, PA (US); Richard Glancy, Short Hills, NJ (US); Michael P. Hobin, Basking Ridge, NJ (US); John Clement, Green Brook, NJ (US); John Toman, Whitehouse, NJ (US)

(73) Assignee: Sorbent Products Co., Inc., NJ (US)

( * ) Notice: Subject to any disclaimer, the term of this patent is extended or adjusted under 35 U.S.C. 154(b) by 37 days.

(21) Appl. No.: 09/755,224

(22) Filed: Jan. 5, 2001

(65) Prior Publication Data

US 2002/0088074 A1 Jul. 11, 2002

(51) Int. Cl.[7] ................................................. B32B 3/06
(52) U.S. Cl. .................... 428/100; 296/38; 184/106; 428/192
(58) Field of Search ............................ 15/215; 296/38; 184/106; 428/100, 192, 45; 52/177; 180/69.1; 220/573

(56) References Cited

U.S. PATENT DOCUMENTS 5,018,235 A * 5/1991 Stamatiou ..................... 15/215
5,834,101 A * 11/1998 Cordani ....................... 428/218

* cited by examiner

Primary Examiner—Harold Pyon
Assistant Examiner—Jane Rhee
(74) Attorney, Agent, or Firm—Gerald E. Hespos; Anthony J. Casella

(57) ABSTRACT

A mat assembly is provided for absorbing liquid, such as oil, that may be spilled near a machine or automotive vehicle. The mat assembly includes a mat with at least an upper layer formed from a woven or non-woven array of fibers. The mat assembly further includes a frame formed from strips that can be cut to match the periphery of the mat. Each strip has a bottom surface with an attachment tape that can be engaged releasably with the woven or non-woven fibers of the mat. The restraining strip may include an array of resilient hooked filaments that can engage the fibers of the mat. The strips hold the mat in a planar orientation. However, the strips can be separated from the mat easily when the mat has become saturated. The mat then can be discarded and replaced with a new mat, and the same strips can be fixed to the upper surface of the new mat.

10 Claims, 2 Drawing Sheets

SORBENT MAT ASSEMBLY

BACKGROUND OF THE INVENTION

1. Field of the Invention

The subject invention relates to a holding frame and a mat assembly for absorbing liquid materials, such as oil, solvents and water based solutions and emulsions.

2. Description of the Related Art

Many industrial machines and automotive vehicles are known to splatter or drip fluids, such as oil solvents, water and the like. For example, many industrial machines employ oil to lubricate moving parts. Gaskets and seals between moving and stationary parts invariably wear and create the potential for leakage of the lubricant. Other industrial machines employ a lubricant at the interface of a tool and work piece. The lubricant can splatter while the work is being performed, and some of the splattered lubricant is likely to be deposited on the floor near the machine. Automotive vehicles also are likely to drip oil while the vehicle is idling and/or while lubricant is being added or changed. Thus, areas where a vehicle will park or idle and areas where a vehicle will be worked on often will have oil deposits on the floor. An accumulation of lubricant on a floor can be hazardous to workers or pedestrians. Additionally, the accumulated lubricant conceivably could be a fire hazard.

Sorbents commonly are used on an area of a floor near an industrial machine that is apt to drip or spray a lubricant. Sorbents come in many different forms, including elongate tubes filled with particulates of sorbent material and mats of non-woven sorbent fiber. Mats are particularly desirable for many applications in that the mat can be walked upon by workers and/or other people who must traverse the oil-splattered floor. The prior art sorbent mats may be formed from non-woven fibers of polypropylene or polyester or blends of such synthetic fibers and recycled cotton fibers. The fibers may be placed in a mat configuration by any of several well known techniques, including needle punch, melt blown, air laid, carded and spun bond techniques. The mats of sorbent fibers also may be laminated with films and composites. Non-woven mats of sorbent material with a thickness of about ⅛"–⅜" can provide an acceptably high degree of absorbency at a reasonable price. Furthermore, these thin non-woven fiber mats are easy to transport and store prior to use and are packaged easily for recycle after saturation. However, thin non-woven fiber mats can be moved in advertently with relative ease. Thus, forces generated by a person walking on a thin non-woven fiber mat, forces generated by a vehicle moving over the non-woven fiber mat or forces generated by air currents can cause the thin non-woven fiber mat to shift from its desired location. Similarly, these same forces can cause the prior art non-woven fiber mat to fold or crease, thereby creating a raised surface on which a worker may trip. Thus, the mat that is intended to avoid a slippery dangerous surface actually can contribute to its own hazardous condition.

The prior art includes several thick, heavy, resilient fatigue mats that are used near work benches, retail counters and the like where workers are likely to stand for long periods of time. Fatigue mats are intended to improve foot and leg comfort, but typically do not absorb liquids. Fatigue mats typically are not very flexible, and hence are not likely to shift, fold or crease. However, the bulk of these prior art mats also make them more costly, and more difficult to ship, store and install. Attempts have been made to utilize the heavy thick characteristics of the fatigue mat to an advantage. For example, the prior art includes fatigue mats formed from several interengageable pieces, that are locked to one another in the manner of a jigsaw puzzle. The assembled pieces can be disassembled for discard or repositioning. The above-described cost and weight characteristics would make these types of prior art mats unacceptable for environments where frequent replacement is necessary, as is the case with sorbent mats that are intended to absorb liquid materials. Furthermore, the jigsaw puzzle type of mats are limited to certain sizes and shapes that are dictated by the sizes and shapes of the various components. Conceivably these prior art mats could be cut to match the specific sizes and shapes of an area. However, the thickness and rigidity that enable the respective jigsaw parts to be assembled also complicates cutting the parts. Furthermore, a cut edge of a thick mat can define a surface discontinuity over which a worker may trip.

In view of the above, an object of the invention is to provide an inexpensive lightweight sorbent mat that can be installed securely and removed easily and quickly.

It is another object of the subject invention to provide a lightweight inexpensive absorbent mat that can be adapted to any convenient size and shape.

SUMMARY OF THE INVENTION

The subject invention is directed to a mat assembly that comprises a sorbent mat and a frame for overlying at least certain peripheral regions of the mat. The frame is sufficiently heavy to securely hold the sorbent mat in place. However, the frame can be separated from a spent sorbet mat and reapplied to a new sorbent mat. Thus, the sorbent mat is disposable and/or recyclable, while the frame is reusable.

The mat may comprise a non-woven array of fibers and may have a backing layer on one side of the array of fibers. More particularly, the mat may comprise a nonwoven array of randomly oriented polypropylene fibers, an array of polyester fibers, or a blend of either of these synthetic fibers with other fibers. For example, the mat may comprise a non-woven array of polyester and cotton fibers with a latex binder on one side. The non-woven array may be achieved by any of several known technologies, such as melt blown, spun bond, ultrasonic, airlaid or needle punch or a combination of these.

The frame of the mat assembly preferably is formed from an elongate retention strip that is extruded or molded from a flexible synthetic material, such as an elastomer or rubber. The elongate retention strip has a bottom surface, a top surface and opposed longitudinal side edges. The bottom surface of the retention strip may be substantially planar, whereas the top surface of the retention strip may be tapered to narrower thicknesses at each of the opposed longitudinal side edges. Thus, the elongate retention strip of the frame may define a maximum thickness centrally between the side edges and may define reduced thicknesses in proximity to the side edges.

The bottom surface of the retention strip from which the frame is formed has attachment means disposed at least at certain locations thereon. The attachment means may be attached during or after the extrusion or molding of the retention strip. The attachment means may comprise an array of hooked filaments that are releasably engageable with the fibers of the mat. For example, the attachment means may comprise one half of a Velcro assembly. The attachment means preferably comprises an elongate continuous ribbon or tape disposed along substantially the entire length of the bottom surface of the retention strip. However, a plurality of spaced apart attachment segments may be disposed at selected locations along the bottom surface of the retention strip. The attachment means may cover the entire bottom surface of the retention strip. However, it is sufficient and preferable to have the attachment means disposed centrally between the side edges of the retention strip. The attachment tape or attachment segments may be affixed to the bottom surface of the retention strip by adhesive. Alternatively, a non-adhesive affixation of the attachment means to the retention strip may be employed.

The retention strip may be a coextruded structure with at least one section having a visual contrast. The contrasting section preferably is disposed at least on the upper surface of the retention strip and may be disposed centrally between the side edges of the retention strip. For example, a major portion of the retention strip may be extruded from a black elastomeric material, while a central portion of the retention strip may define longitudinally extending design, logos or printing. For example, a different color (e.g., yellow) may be provided as a warning signal.

The mat assembly is employed by cutting the non-woven mat to a desired size and shape for the intended application. Mats of this type typically can be cut with a conventional scissor. The frame assembly has a size and shape corresponding to the size and shape of the periphery of the mat. More particularly, the frame assembly is formed from a plurality of retention strips. The retention strips may be pre-molded to specified dimensions. Alternatively, the retention strips can be cut with a utility knife, utility shears or heavy duty scissors for form the frame assembly. The bottom surfaces of the cut retention strips then merely are laid on the top surface of the mat. The Velcro or other attachment means on the bottom surface of the retention strips will releasably engage the non-woven fibers on upper peripheral regions of the mat. Thus, peripheral regions of the mat will be held in a substantially planar orientation on the substrate by the weight of the frame. Furthermore, the engagement between the bottom surface of the retention strip and the non-woven fiber array of the mat will prevent the frame from moving relative to the mat.

The frame assembly can be formed by cutting the retention strip at an acute angle (e.g., 45°) at locations corresponding to the corners of the mat. Alternatively, the retention strip can be formed from a plurality of segments of specified length. The segments may be pre-molded or otherwise formed to have 45° corners. The retention strips preferably are symmetrical in cross-section, and hence a plurality of pre-formed retention strips with 45° ends can be butted to one another merely by reversing alternate strips to define a retention strip of any desired length. Thus, the frame effectively is mitered to overlie the corners of the mat. Alternatively, the frame assembly may comprise corner sections that extend through 90° at either an internal or an external corner. The remaining portions of the retention strips then can be cut at right angles to the longitudinal direction of the retention strip, and the strip may merely be butted against the corner pieces.

The mat will remain planar and stationary due to the cooperation with the retention strips, and particularly the attachment portions on the bottom surface of the strip. The tapered configuration of the strips will substantially prevent accidental tripping by workers or other pedestrians near the mat assembly. Additionally, the preferred coextruded multicolor strips enhance visible detection of the mat assembly, and further reduce the likelihood of accidentally tripping over edge portions of the mat assembly. Oil or other liquids that may be deposited on the mat assembly will be absorbed by the nonwoven fiber array of the mat. The bottom layer or backing sheet of the mat will prevent any such oil or liquids from permeating through the mat and onto the substrate. When the mat approaches saturation, the strips need merely be peeled away from peripheral regions of the mat. The mat then may be discarded or recycled in the conventional manner for such sorbent mats. A new section of mat then can be cut from a roll and placed on the section of the substrate that had previously been protected by the removed saturated mat. The previously employed retention strips of the frame assembly then can be repositioned around the periphery of the new mat.

DETAILED DESCRIPTION OF THE PREFERRED EMBODIMENT

Figure 1:
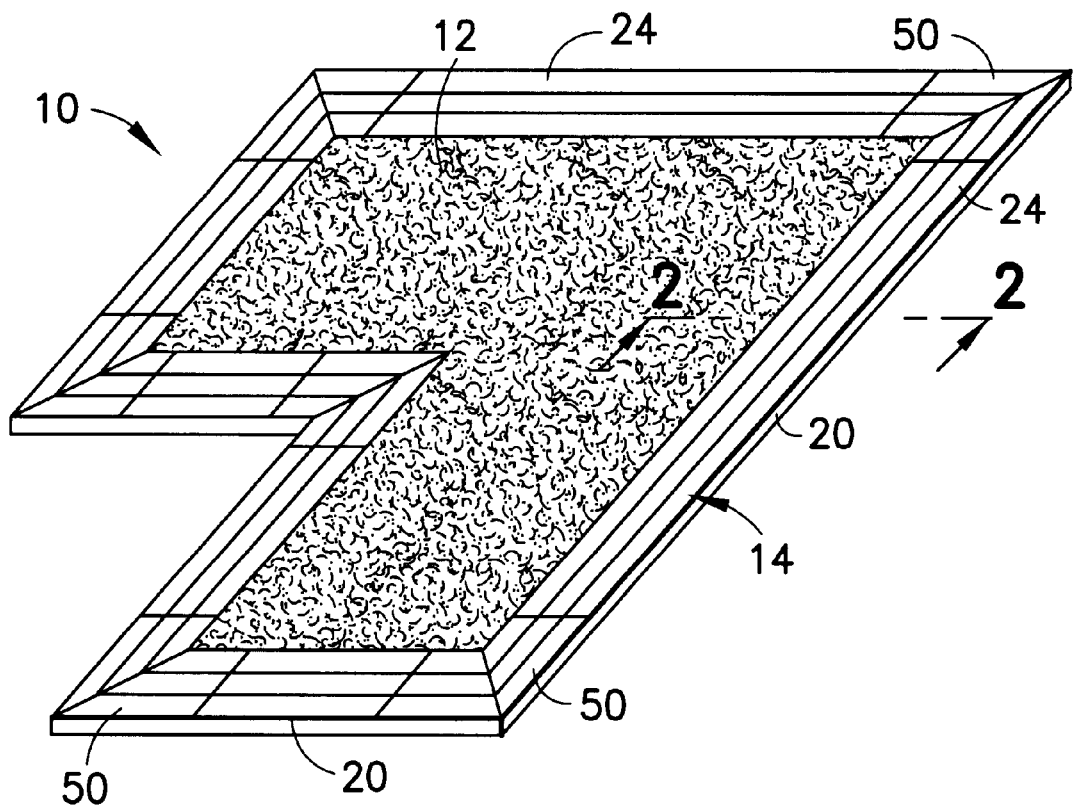
FIG. 1 is a perspective view of a mat assembly in accordance with the subject invention.
Figure 2:
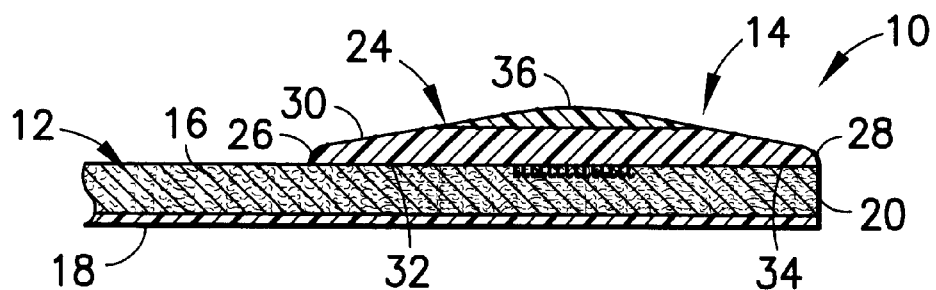
FIG. 2 is a cross-sectional view taken along line 2—2 in FIG. 1.
Figure 3:
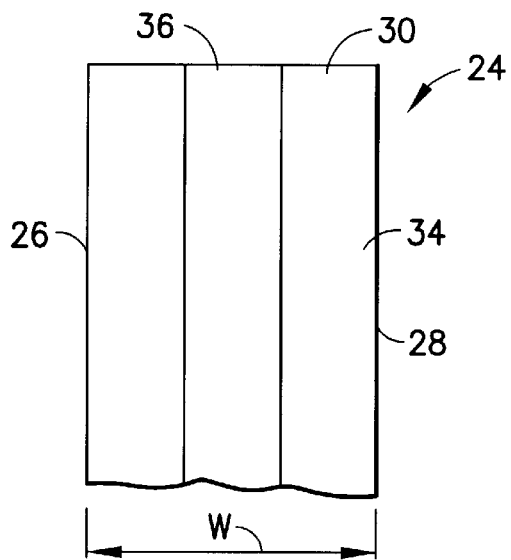
FIG. 3 is a top plan view of a retention strip of the mat assembly.
Figure 4:
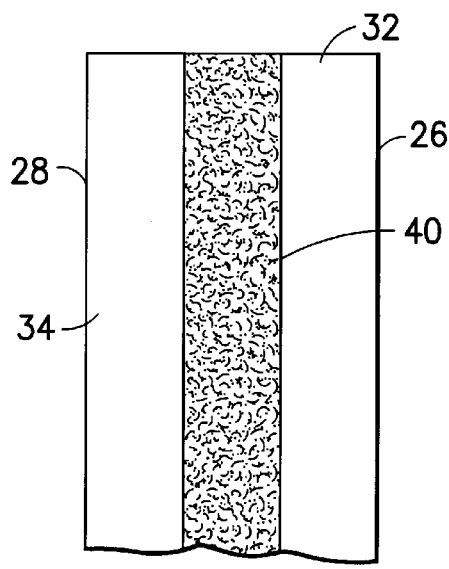
FIG. 4 is a bottom plan view of the retention strip shown in FIG. 3.

A mat assembly in accordance with the subject invention is identified generally by the numeral 10 in FIGS. 1 and 2. The mat assembly 10 comprises a mat 12 and a frame 14. The mat 12 has a top surface 16 and an opposed bottom surface 18 which are spaced sufficiently apart to define a thickness for the mat 12 of about 0.25–0.375". Portions of the mat 12 adjacent the upper surface 16 comprise at least one nonwoven array of fibers that exhibit appropriate absorbency for the intended use. Additionally, the upper surface 16 of the mat 12 is formed to define an array of fuzzy loops facing upward. The fuzzy loops may be made by needle punch, air laid, resin, bonded, carded or buffed technologies. For example, portions of the mat 12 adjacent the top surface 16 may comprise randomly oriented polypropylene microfibers having diameters of 2–10 microns. An alternate mat could be formed from non-woven staple fibers of polypropylene 96%–98% and EMA 2%–4%, and these respective fibers could have diameters in the range of 25–35 microns. Still another alternate mat 12 could be formed from recycled cotton and polyester fibers oriented in a non-woven array and with a latex binder on one side.

Portions of the mat 12 adjacent the bottom surface 18 preferably define a barrier that is chemical resistant and skid resistant. The barrier adjacent the bottom surface 18 of the mat 12 prevents liquid from striking through the mat 12 and hence avoids contamination of the floor and/or ground. Furthermore, the barrier adjacent the bottom surface 18 enhances the sorbent efficiency of the non-woven fabric adjacent the upper surface 16 by forcing migration of liquid into the sorbent portions of the mat 12. The barrier at the bottom surface 18 may be a low density polyethylene barrier film with a thickness of about 3 mils that is secured to the lower surface of the non-woven sorbent fabric. Alternatively, a chemical resistant non-skid backing can be co-extruded for attachment to the lower surface of the needle punch non-woven layer. Alternatively, a barrier may be defined by heat fusing one surface of a non-woven needle punch staple fiber mat. Still further, the bottom surface 18 may be a melt blown polypropylene non-woven lint-resistant cover stock. In all of these options, the barrier adjacent the lower surface 18 prevents strike through of liquid that may be deposited on the mat 12 and further resists skidding of the mat 12 on the supporting surface.

In certain embodiments, the mat 12 may include an intermediate layer. For example, the mat 12 may have an upper layer of needle punch non-woven polypropylene and an intermediate layer of melt blown non-woven polypropylene that is hydrophobic or hydrophilic in accordance with requirements of a particular application. An LDPE barrier film then may be secured to the lower surface of the melt blown intermediate layer.

The mat assembly 10 illustrated in FIG. 1 is of substantially L-shaped plan view configuration. This configuration is illustrated for discussion purposes only. A more typical configuration would be a rectangular mat assembly. However, many other configurations are possible in accordance with the subject invention. The configuration shown in FIG. 10 or any other configuration can be achieved with simple tools, such as scissors, utility snips and/or utility knives. In particular, the mat 12 can be cut easily with conventional scissors to a shape appropriate for the shape of the area on the substrate that is to be protected.

As shown in FIG. 2, the mat 12 includes an edge 20. As explained above, an edge region of a thin flexible mat easily can be folded into a non-planar shape, and can lead to accidental tripping by workers or pedestrians in the area of the mat 12. The frame 14 of the mat assembly 10 substantially prevents the mat 12 from folding, wrinkling or otherwise moving. The frame 14 comprises a plurality of retention strips 24. Each retention strip 24 is an elongate member coextruded from an elastomeric material, and preferably a flexible PVC, to include opposed longitudinal side edges 26 and 28, a top surface 30 and a bottom surface 32. The retention strip 24 includes a base portion 34 that extends unitarily between the sides 26 and 28. The retention strip 24 further includes a contrast stripe 36 integrally extruded with the base 34 at a location on the top surface 30 centrally between the side edges 26 and 28. The contrast stripe 34 is a different color than the base 34. For example, the base 34 may be extruded from the black elastomeric material, while the contrast stripe 36 may be extruded from a bright yellow material. The coextrusion process is carried out to substantially prevent separation of the contrast stripe 36 from the base 34.

Figure 5:
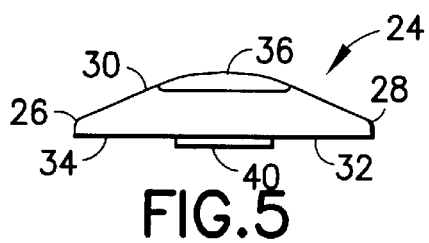
FIG. 5 is an end elevational view of the retention strip.
Figure 6:
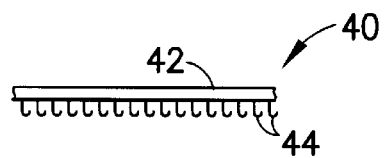
FIG. 6 is a side elevational view of the attachment tape.

The retention strip 24 is extruded such that the bottom surface 32 is substantially planar and such that the top surface 30 His convexly arcuate between the side edges 26 and 28, as shown most clearly in FIG. 5. More particularly, the strip 24 may define a maximum thickness of about ⅜" at locations centrally between the side edges 26 and 28 and a minimum thickness of less than ⅛" at locations substantially adjacent the side edges 26 and 28.

An attachment tape 40 is securely affixed to the bottom surface 32 of the retention strip 24. The attachment tape 40 comprises a substrate 42 and an array of resiliently deflectable hooked filaments 44 extending from the substrate 42. Attachment tapes 40 of this general type are sold under the trademark "VELCRO". The substrate 42 of the attachment tape 40 is securely adhered to the bottom surface 32 of the retention strip 24 at a location centrally between the side edges 26 and 28 of the retention strip 24. More particularly, the substrate 42 preferably is secured to the bottom surface 32 of the retention strip by a solvent or heat activated adhesive which is resistant to degradation of the adhesive due to plasticisers in the retention strip 24. The retention strip 24 preferably defines a width "W" of about 3.50" and the attachment tape 40 preferably defines a width of about 1.5". Thus, regions of the bottom surface 32 between the attachment tape 40 and the respective side edges 26 and 28 define widths of about 1.0".

The resiliently deflectable hooks 44 of the attachment tape 40 are releasably engageable with the fibers adjacent the upper surface 16of the mat 12. Thus, as shown in FIGS. 1 and 2, the bottom surface 32 of the retention strip 24 can be placed on portions of the upper surface 16 of the mat 12 adjacent a side edge 20. A minor downward force exerted on the retention strip 24 will cause the resiliently deflectable hooked filaments 44 of the retention strip 40 to releasably engage the fibers of the non-woven mat 12. Thus, the retention strip 24 will be retained on portions of the upper surface 16 of the mat 12 adjacent the side edge 20. Furthermore, the retention strip 24 will provide sufficient weight to prevent the mat assembly 14 from folding into a non-planar orientation. With this configuration, the mat will not assume a wrinkled or folded configuration that could cause workers or pedestrians near the mat assembly 10 to trip. Furthermore, the mat assembly 10 can be used at exterior locations without significant risk of the mat 12 blowing away from the portion of the substrate to which the mat assembly 10 had been applied initially.

Figure 7:
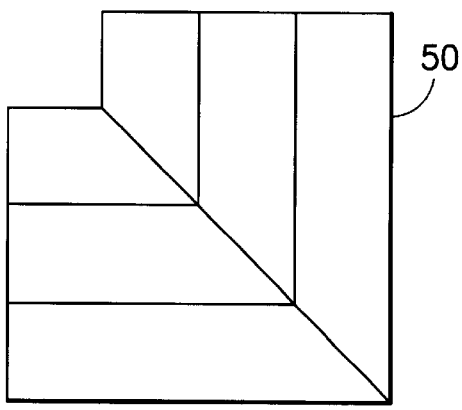
FIG. 7 is a top plan view of a modular corner for use with the retention strips of FIGS. 3–5.
Figure 8:
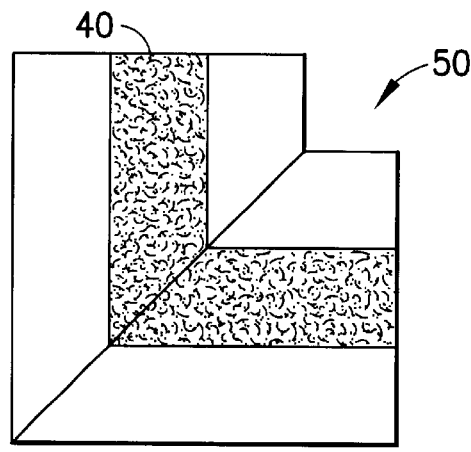
FIG. 8 is a bottom plan view of the modular corner shown in FIG. 7.

The retention strip 24 may be cut to any selected length by scissors, snips or a utility knife to appropriate dimensions based on the dimensions of the mat 12. However, to avoid complicated mitering, the frame 14 includes a plurality of corners 50 that are premitered into a right angle configuration. The corners 50 include the attachment tapes 52 on the lower surface, as shown most clearly in FIG. 7. Furthermore, the corners 50 define a cross-sectional shape substantially identical to the cross-sectional shape of the strip 24 as shown in FIG. 5.

The mat assembly 10 is employed by initially cutting the mat 12 to a selected size and shape depending upon the size and shape of the floor or other substrate to be protected. In this regard, the mat 12 may be purchased and stored in a roll form. Thus, a sufficient part of the mat 12 can be unrolled and cut to an appropriate size and shape. The cutting can be carried out with conventional scissors, snips or a utility knife. The mat 12 then is placed on the floor or other substrate to be protected, such that the bottom surface 18 of the mat 12 is supported on the floor or other substrate. As noted above, the bottom surface 18 preferably is a film or backing layer that is substantially impervious to the fluid that is apt to be deposited on the mat assembly 10. As a result of this orientation, the nonwoven fiber array adjacent the upper surface 16 faces upwardly. The corners 50 then may be placed at the convex or exterior corners and the concave or interior corners of the properly cut mat 12. The installer then positions elongate linear sections of the retention strips 24 between the corners 50. The retention strips 24 may be cut by scissors, snips or a utility knife to the appropriate linear dimension for fitting between adjacent corners 50.

The mat 12 of the mat assembly 10 provides sorbency for absorbing oil or other liquid that may be dripped or splattered. Thus, the mat 12 absorbs oil or other liquid that would otherwise accumulate on the floor. The strips 24 and the corners 50 function to hold the mat 12 in a substantially planar orientation. More particularly, corner and edge regions 20 of the mat 12 are prevented by the strips 24 and corners 50 from curling or folding upwardly in a manner that could create a safety hazard to workers or other pedestrians. Additionally, the contrast stripe 36 provides good visual indication of the presence of the mat assembly 10, thereby further preventing a worker or pedestrian from accidentally tripping over the mat assembly 10. Still further, the tapered narrow sides of the strip 24 minimize the potential for tripping as a person steps onto or off of the mat assembly 10.

After sufficient use, the mat 12 may approach saturation by oil or other liquid being spilled on the mat 12. At this time, the strips 24 may be separated from the mat 12. This merely requires an upward pulling of the strips 24 relative to the mat 12. Such pulling force will deform the filament hooks 44 of the attachment tape 40 and further may cause some disengagement of the non-woven fibers of the mat 12. The mat 12 then may be folded or rolled for discard or recycling as appropriate. The strips 24 and the corners 50, however, are retained for further use. Thus, a new mat 12 can be cut as appropriate for disposition on the area of the floor from which the soiled mat 12 had been removed. The previously cut strips 24 and corners 50 then can be placed adjacent the edge regions 20 of the new mat 12 so that the restraining strips 40 releasably engage the upper surface 16 of the new mat 12.

While the invention has been described with respect to a preferred embodiment, it is apparent that various changes can be made without departing from the scope of the invention as defined by the appended claims.

What is claimed is:

1. A mat assembly comprising a flexible mat having opposed upper and lower surfaces, at least the upper surface of the mat being formed from an array of fibers selected such that mat exhibits liquid sorbency, the mat having a plurality of side edges, a frame releasably secured to the upper surface of the mat adjacent the side edges of the mat for holding the mat substantially stationary and in a planar orientation, wherein the frame comprises a lower surface having an attachment tape secured thereon, the attachment tape comprising non-linear filaments releasably engageable with the fibers of the mat.

2. The mat assembly of claim 1, wherein at least the upper surface of the mat comprises a non-woven array of fibers.

3. The mat assembly of claim 2, wherein the mat comprises a bottom surface formed from a layer of material that is not absorbent and that is substantially less permeable than the upper surface.

4. The mat assembly of claim 1, wherein the attachment tape is secured to the lower surface of the frame by adhesive.

5. The mat assembly of claim 1, wherein the frame comprises a plurality of strips secured respectively to the mat adjacent the respective edges.

6. The mat assembly of claim 5, wherein each said strip further has a top surface and a pair of side edges, the top surface being substantially convexly arcuate between the side edges.

7. The mat assembly of claim 6, wherein each said strip is coextruded and includes a base formed from an elastomeric material of a first color and a contrast stripe formed from an elastomeric material of a second color, the contrast stripe being substantially centrally between the side edges of the strip.

8. The mat assembly of claim 7, wherein the strip is approximately 3.5 inches wide and has a maximum thickness of about ⅜".

9. The mat assembly of claim 5, further comprising mitered corner portions overlying corners of the mat and extending between linear sections of the strips.

10. A mat assembly comprising a flexible mat having opposite upper and lower surfaces, a liquid impervious film extending across the lower surface of the mat, an array of non-woven fibers extending from the film to the upper surface of the mat, the mat further comprising a periphery having a plurality of side edges and a corresponding plurality of right angle corners between adjacent edges, a frame disposed on the upper surface of the mat adjacent the periphery, the frame comprising a plurality of mitered strips extending between the respective corners and overlying portions of the upper surface of the mat adjacent the side edges of the mat, each said strip having opposite top and bottom surfaces, attachment tapes being secured to the respective bottom surfaces and comprising an array of hook-shaped filaments that are releasably engageable with the fibers adjacent the upper surface of the mat, whereby the attachment tape enables releasable engagement of the frame to the mat, and whereby the frame securely holds the mat in a selected orientation on a substrate.

* * * * *